United States Patent
Chen et al.

(10) Patent No.: US 12,548,115 B2
(45) Date of Patent: Feb. 10, 2026

(54) PATHOLOGICAL SECTION ANALYZER WITH LARGE FIELD OF VIEW, HIGH THROUGHPUT AND HIGH RESOLUTION

(71) Applicant: Xidian University, Xi'an (CN)

(72) Inventors: Xueli Chen, Xi'an (CN); Huan Kang, Xi'an (CN); Hui Xie, Xi'an (CN); Duofang Chen, Xi'an (CN); Shenghan Ren, Xi'an (CN); Wangting Zhou, Xi'an (CN)

(73) Assignee: Xidian University, Xi'an (CN)

( * ) Notice: Subject to any disclaimer, the term of this patent is extended or adjusted under 35 U.S.C. 154(b) by 470 days.

(21) Appl. No.: 18/104,812

(22) Filed: Feb. 2, 2023

(65) Prior Publication Data
US 2023/0177645 A1 Jun. 8, 2023

Related U.S. Application Data

(63) Continuation of application No. PCT/CN2021/102379, filed on Jun. 25, 2021.

(30) Foreign Application Priority Data

Dec. 7, 2020 (CN) .......................... 202011420323.8

(51) Int. Cl.
*G06T 3/4053* (2024.01)
*G02B 21/26* (2006.01)
(Continued)

(52) U.S. Cl.
CPC ............ *G06T 3/4053* (2013.01); *G02B 21/26* (2013.01); *G02B 21/365* (2013.01);
(Continued)

(58) Field of Classification Search
CPC .... H04N 23/955; H04N 23/00; H04N 3/1506; H04N 3/1512; H04N 23/56; G02B 21/26;
(Continued)

(56) References Cited

U.S. PATENT DOCUMENTS 10,795,315 B2 * 10/2020 Ozcan .................. G03H 1/0005
11,222,415 B2 * 1/2022 Ozcan ...................... G06T 5/70
(Continued)

OTHER PUBLICATIONS

Alon Greenbaum et al., Wide-field computational imaging of pathology slides using lens-free on-chip microscopy.Sci. Transl. Med. 6,267ra175-267ra175(2014).DOI:10.1126/scitranslmed.3009850 (Year: 2014).*

(Continued)

*Primary Examiner* — Utpal D Shah
*Assistant Examiner* — Jack Peter Kraynak
(74) *Attorney, Agent, or Firm* — Zhigang Ma (57) ABSTRACT

A large-field-of-view, high-throughput and high-resolution pathological section analyzer includes an image collector for collecting a set of computing microscopic images of a pathological section sample; a data preprocessing circuit for iteratively updating the set of computing microscopic images by a multi-height phase recovery algorithm to obtain a low-resolution reconstructed image; an image super-resolution circuit for super-resolving the low-resolution reconstructed image according to a pre-trained super-resolution model to obtain a high-resolution reconstructed image; and an image analysis circuit for automatically analyzing the high-resolution reconstructed image according to different tasks, and specifically selecting different analysis models according to the different tasks to obtain corresponding auxiliary diagnosis results. Imaging visual field of the pathological section analyzer is hundreds of times that of the traditional optical microscope, a deep learning network is adopted to analyze pathological conditions of unstained pathological sections, so that the analysis process of pathological sections is simplified.

5 Claims, 8 Drawing Sheets

(51) Int. Cl.
| | |
|---|---|
| *G02B 21/36* | (2006.01) |
| *G06T 3/4007* | (2024.01) |
| *G06T 3/4046* | (2024.01) |
| *G06T 7/00* | (2017.01) |
| *G06V 10/26* | (2022.01) |
| *G06V 10/74* | (2022.01) |
| *G06V 10/762* | (2022.01) |
| *G06V 10/764* | (2022.01) |
| *G06V 10/774* | (2022.01) |
| *G06V 10/82* | (2022.01) |
| *G06V 20/70* | (2022.01) |
| *H04N 23/56* | (2023.01) |
| *H04N 23/955* | (2023.01) |
| *H04N 25/76* | (2023.01) |

(52) U.S. Cl.
CPC .......... *G06T 3/4007* (2013.01); *G06T 3/4046* (2013.01); *G06T 7/0012* (2013.01); *G06V 10/26* (2022.01); *G06V 10/761* (2022.01); *G06V 10/763* (2022.01); *G06V 10/764* (2022.01); *G06V 10/774* (2022.01); *G06V 10/82* (2022.01); *G06V 20/70* (2022.01); *H04N 23/56* (2023.01); *H04N 23/955* (2023.01); *H04N 25/76* (2023.01); *G06T 2207/10056* (2013.01); *G06T 2207/20081* (2013.01); *G06T 2207/20084* (2013.01); *G06T 2207/20132* (2013.01); *G06T 2207/20192* (2013.01); *G06T 2207/30024* (2013.01); *G06V 2201/03* (2022.01)

(58) Field of Classification Search
CPC ........ G02B 21/365; G06T 2207/10056; G06T 2207/20192; G06T 7/0012; G06T 3/4046; G06T 2207/20081; G06T 2207/20084; G06T 2207/30024; G06T 3/4053–4076; G06V 10/26; G06V 10/764; G06V 10/774; G06V 20/70; G06V 10/763; G06V 10/761; G06V 2201/03; G06V 10/82

See application file for complete search history.

(56) References Cited

U.S. PATENT DOCUMENTS

| | | | | |
|---|---|---|---|---|
| 12,106,552 | B2* | 10/2024 | Ozcan | G06V 20/693 |
| 2017/0220000 | A1* | 8/2017 | Ozcan | G03H 1/0866 |
| 2020/0349707 | A1* | 11/2020 | Hosseini | G06V 10/7788 |
| 2022/0138939 | A1* | 5/2022 | Jalali | G16H 10/40 |
| | | | | 348/79 |
| 2022/0206434 | A1* | 6/2022 | Ozcan | G03H 1/0866 |

OTHER PUBLICATIONS

Deng Y, Feng M, Jiang Y, et al. Development of pathological reconstructed high-resolution images using artificial intelligence based on whole slide image. MedComm. 2020; 1: 410-417. https://doi.org/10.1002/mco2.39 (Year: 2020).*

Eom, J., & Moon, S. (2018). Three-Dimensional High-Resolution Digital Inline Hologram Reconstruction with a Volumetric Deconvolution Method. Sensors (Basel, Switzerland), 18(9), 2918. https://doi.org/10.3390/s18092918 (Year: 2018).*

J. Zhang et al., "High-Throughput Deep Learning Microscopy Using Multi-Angle Super-Resolution," in IEEE Photonics Journal, vol. 12, No. 2, pp. 1-14, Apr. 2020, Art No. 6900914, doi: 10.1109/JPHOT.2020.2977888 (Year: 2020).*

Yichen Wu, Aydogan Ozcan, Lensless digital holographic microscopy and its applications in biomedicine and environmental monitoring, Methods, vol. 136, 2018, pp. 4-16, ISSN 1046-2023, https://doi.org/10.1016/j.ymeth.2017.08.013. (Year: 2018).*

Y. Zhang, A. Greenbaum, W. Luo, A. Ozcan, Wide-field pathology imaging using on-chip microscopy, Virchows Arch., 467 (2015), pp. 3-7, 10.1007/s00428-015-1782-z (Year: 2015).*

* cited by examiner

| | GT 0 | GT 1 |
|---|---|---|
| Predict 0 | 4510 | 206 |
| Predict 1 | 5290 | 23794 |

PATHOLOGICAL SECTION ANALYZER WITH LARGE FIELD OF VIEW, HIGH THROUGHPUT AND HIGH RESOLUTION

TECHNICAL FIELD

The present disclosure relates to the technical field of medical images, and in particular, to a pathological section analyzer with large field of view, high throughput and high resolution.

DESCRIPTION OF RELATED ART

Optical inspection of pathological section microscopic characteristics is one of gold standards for diagnosing diseases. The pathological section is prepared by fixing a lesion tissue with formalin, dehydrating it and embedding it in a paraffin block, cutting it into a thin section with a microtome, staining it with hematoxylin-eosin dye and packaging it. After the above operations, the pathologist can either read the section by an optical microscope, or convert the section into an electronic image by a whole slide image scanner for online reading and record a position of the suspicious tissue in the whole slide image (WSI) and its occurrence and development process, and finally make pathological diagnosis according to subjective judgment.

The existing imaging methods and analysis process of pathological sections still have the following shortcomings: (1) There is a contradiction between visual field and resolution, whether by the optical microscope or the electronic reading, that is, obtaining the high-resolution image is bound to be accompanied by the smaller visual field; (2) It is a highly repetitive process for the pathologist to mark WSIs. Switching back and forth between high resolution image and low resolution image will easily lead to missed diagnosis of small lesions, and the accuracy of marking cannot be strictly guaranteed by reading WSIs for a long time; (3) In the above process, the original sections need to be stained for better observation, which is time-consuming and will cause some damage to tissues; (4) Although stimulated Raman microscopic imaging technology can provide rapid, mark-free and sub-micron resolution imaging for untreated biological tissues, the stimulated Raman microscopic imaging technology has the small field of view and complex system, so it is not suitable for clinic.

SUMMARY OF THE DISCLOSURE

In order to solve the above problems in the prior art, the present disclosure provides a pathological section analyzer with large field of view, high throughput and high resolution. The technical problems to be solved by the present disclosure is realized by the following technical solutions.

The present disclosure provides a pathological section analyzer with large field of view, high throughput and high resolution, the pathological section analyzer includes an image collector, a data preprocessing circuit, an image super-resolution circuit, and an image analysis circuit; and a use process of the pathological section analyzer includes:

step 1, obtaining an unstained pathological section sample from clinic;

step 2, collecting computing microscopic images of the pathological section sample in step 1 at different heights by using the image collector;

step 3, inputting the computing microscopic images at the different heights in step 2 into the data preprocessing circuit to obtain a low-resolution reconstructed image after twin images are removed;

step 4, inputting the low-resolution reconstructed image in step 3 into the image super-resolution circuit to obtain a high-resolution reconstructed image; and step 5, inputting the high-resolution reconstructed image in step 4 into the image analysis circuit to obtain an auxiliary diagnosis result of the pathological section sample in step 1.

In an embodiment of the present disclosure, the data preprocessing circuit is embodied by at least one processor and at least one memory coupled to the at least one processor, and the at least one memory stores programs executable by the at least one processor. Likewise, the image super-resolution circuit is embodied by at least one processor and at least one memory coupled to the at least one processor, and the at least one memory stores programs executable by the at least one processor. Likewise, the image analysis circuit is embodied by at least one processor and at least one memory coupled to the at least one processor, and the at least one memory stores programs executable by the at least one processor.

In an embodiment of the present disclosure, the image collector includes: a lensfree coaxial computing microscopic multi-height image collection system, a one-dimensional translation stage and a two-dimensional electric translation stage;

The lensfree coaxial computing microscopic multi-height image collection system includes a monochromatic laser light source, a pinhole, the pathological section sample, an objective table, a complementary metal oxide semiconductor (CMOS) image sensor and an optical connection component; the lensfree coaxial computing microscopic multi-height image collection system is configured (i.e., structured and arranged) to obtain the computing microscopic image by the following progress: a spherical wave emitted by the monochromatic laser light source is filtered by the pinhole and then transmitted to a plane of the pathological section sample placed on the objective table to generate a surface wave and a reference wave, and the surface wave and the reference wave interfere to form a hologram, which is recorded by the CMOS image sensor to obtain the computing microscopic image;

The one-dimensional translation stage and the two-dimensional electric translation stage are the integrated optical component, which are respectively configured to adjust the CMOS image sensor in the lensfree coaxial computing microscopic multi-height image collection system back and forth along an optical path direction, and adjust a position of the monochromatic laser light source, thereby to make a light wave emitted by the monochromatic laser light source illuminate the pathological section sample;

The lensfree coaxial computational microscope multi-height image collection system is configured to collect the computing microscopic images at the different heights, and specific operations thereof include the following steps:

step 21, adjusting the two-dimensional electric translation stage which controls the monochromatic laser light source and the one-dimensional translation stage which controls the CMOS image sensor to make the light wave emitted by the monochromatic laser light source completely cover a photosensitive plane of the CMOS image sensor;

step 22, recording a computing microscopic image captured by the CMOS image sensor when the pathological section sample is not placed on the objective table;

step 23, placing the pathological section sample on the objective table, rotating a knob of the one-dimensional translation stage forward at a fixed interval along a light wave transmission direction, and capturing the computing microscopic images at the different heights by the CMOS image sensor; and step 24, taking the computing microscopic images collected in steps 22 and 23 as a set of computing microscopic images corresponding to the pathological section sample.

In an embodiment of the present disclosure, the data preprocessing circuit is configured to use a multi-height phase recovery algorithm to iteratively update the set of computing microscopic images of the pathological section sample to eliminate interference of the twin images, and specific operations thereof include the following steps:

step 31, registering the computing microscopic images at the different heights left and right along the light wave transmission direction to eliminate lateral drift among the computing microscopic images when rotating the knob of the one-dimensional translation stage; and step 32, iteratively updating the registered computing microscopic images at the different heights according to the multi-height phase recovery algorithm to obtain the low-resolution reconstructed image after the twin images are removed.

In an embodiment of the present disclosure, the image super-resolution circuit is configured to perform the following steps:

step 41, cropping the low-resolution reconstructed image into image patches with a size of 512*512 pixels in a fixed order, with lengths and widths overlapping by ⅔ pixels;

step 42, inputting the image patches in step 41 into a pre-trained super-resolution model to obtain high-resolution image patches;

step 43, replacing pixel values of ⅓ areas at boundaries of left and right adjacent high-resolution image patches with pixel values of a ⅓ length or width area at a middle of the high-resolution image patch to eliminate boundary blur caused by truncation effect; and step 44, recovering the high-resolution image patches without boundary blur obtained in step 43 into a complete high-resolution reconstructed image according to the cropping order (i.e., the fixed order) in step 41, and thereby realizing the super-resolution of the low-resolution reconstructed image. The complete high-resolution reconstruction image (i.e., high-resolution reconstruction image) in the above statement is also referred to as WSI in clinical electronic scanning.

In an embodiment of the present disclosure, the pre-trained super-resolution model is obtained by using different training methods according to different sources of actually available hematoxylin-eosin (HE) staining WSIs; when HE straining WSIs corresponding to tissue areas adjacent to the pathological section sample are obtained, the pre-trained super-resolution model is obtained by training with a training strategy based on registration mapping, or when any HE staining WSIs irrelevant to the pathological section sample are obtained, the pre-trained super-resolution model is obtained by training with a training strategy based on modeling mapping;

The training strategy based on registration mapping is obtained by the following steps:

step 61, obtaining low-resolution reconstructed images of pathological section samples;

step 62, searching and intercepting a HE staining WSI which is consistent with an area of the low-resolution reconstructed image in step 61 from the adjacent HE staining WSI of each pathological section sample;

step 63, interpolating and scaling each the low-resolution reconstructed image in step 61 with a size of the corresponding HE staining WSI in step 62 as a target to make their widths and heights are equal;

step 64, registering the low-resolution reconstructed images with the same image size with their corresponding HE staining WSIs;

step 65, cropping the registered low-resolution reconstructed images and the registered HE-staining WSIs according to the size of 512*512 pixels to obtain low-resolution reconstructed image patches and HE staining WSI patches required for network training;

step 66, training a mapping relationship between the low-resolution reconstructed image patches and the HE staining WSI patches in step 65 by using the convolutional neural network to obtain the pre-trained super-resolution model trained by the training strategy based on registration mapping;

The training strategy based on modeling mapping is obtained by the following steps:

step 71, cropping any HE staining WSI into HE staining WSI patches with the same size as a computing microscopic image captured by the CMOS image sensor, and using them as a training data set of a simulation model;

step 72, recording setting of actual parameters of the lensfree coaxial computing microscopic multi-height image collection system; the actual parameters include a diffraction distance z, a wavelength λ of the monochromatic laser light source, a pixel size pix of the CMOS image sensor;

step 73, defining an angular spectrum diffraction physical model corresponding to the parameters in step 72 in an upper branch of the simulation model, where an initial input of the angular spectrum diffraction physical model is the HE staining WSI patches in step 71; defining a convolution neural network model in a lower branch of the simulation model to learn a mapping relationship between computing microscopic images output by the upper branch and the HE staining WSI patches in step 71, where an output of the lower branch is an input of the upper branch in subsequent iterations; and optimizing the convolution neural network model of the lower branch by quantifying a difference between the output of the lower branch and the HE staining WSI patches in step 71;

step 74, when the difference in step 73 is less than a preset value, obtaining the pre-trained super-resolution model trained by the training strategy based on modeling mapping.

In an embodiment of the present disclosure, the image analysis circuit is configured to predict microenvironments or section-level classify in the high-resolution reconstructed image according to different auxiliary diagnostic tasks expected to be performed, including the following steps:

step 51, cropping the high-resolution reconstructed image into high-resolution image patches with a size of 256*256;

step 52, inputting the high-resolution image patches in step 51 into a pre-training network model of microenvironment analysis to obtain a microenvironment composition of each area in the high-resolution reconstructed image; and step 53, inputting the high-resolution image patches in step 51 into a pre-training classification model to obtain a category attribute of the high-resolution reconstructed image.

The pre-training network model of microenvironment analysis is obtained by the following steps:

step 81, obtaining high-resolution reconstructed images of pathological section samples;

step 82, annotating the high-resolution reconstructed images in step 81; where fat is annotated as 0, a tissue fragment is annotated as 1, a lymphocyte is annotated as 2, mucus is annotated as 3, a smooth muscle is annotated as 4, a matrix is annotated as 5, a normal tissue is annotated as 6 and a tumor tissue is annotated as 7;

step 83, dividing each of the high-resolution reconstructed images with annotations according to a size of 256*256 pixels to obtain high-resolution image patches and their corresponding microenvironment labels, and dividing them into a training data set and a verification data set by 7:3; and step 84, training a convolutional neural network by using the training data set and the verification data set to obtain a mapping relationship between the high-resolution image patches and their corresponding microenvironment labels, and obtaining the pre-training network model of microenvironment analysis.

The pre-training classification model is obtained by the following steps:

step 91, obtaining high-resolution reconstructed images of pathological section samples;

step 92, dividing each of the high-resolution reconstructed images with a size of 256*256 pixels to obtain high-resolution image patches, and storing the high-resolution image patches corresponding to the same high-resolution reconstructed image in a same bag, where a label of the bag is a label of the corresponding pathological section sample;

step 93, using a feature extractor to extract feature representation of the high-resolution image patches in each bag to obtain a feature representation matrix corresponding to the bag;

step 94, using k-means clustering to obtain a cluster center matrix corresponding to each the feature representation matrix, and calculating a cosine similarity between each the high-resolution reconstructed image patch in the feature representation matrix and each the cluster center vector in the cluster center matrix to form a similarity matrix;

step 95, inputting each the feature representation matrix and the similarity matrix into a plurality of multi-head self-attention layers in rows and columns to obtain an aggregation matrix;

step 96, applying gated attention to the aggregation matrix to obtain section-level aggregation vectors and predicted outputs;

step 97, establishing constraints between the predicted outputs in step 96 and the corresponding section-level labels for network training, and repeatedly executing a plurality of training batches to obtain the pre-training classification model.

Compared with the prior art, the present disclosure has the following beneficial effects:

1. The large-field-of-view high-throughput high-resolution pathological section analyzer of the present disclosure has the advantages of large-field-of-view and high-throughput imaging, and the imaging visual field is hundreds of times that of the traditional optical microscope. A pixel detector is used to collect signals, and the imaging visual field is equal to the size of an active area of the pixel detector, and images can be quickly acquired.

2. The large-view-field high-throughput high-resolution pathological section analyzer of the present disclosure does not rely on the objective lens to obtain images, greatly reduces the cost consumption of the instrument, and is suitable for clinical diagnosis, especially in areas with scarce resources.

3. The large-view-field high-throughput high-resolution pathological section analyzer of the present disclosure can quickly and effectively realize the super-resolution of the low-resolution reconstructed image without relying on high-precision system operation and complex multi-frame super-resolution algorithm, thus reducing the operation complexity of the system and improving the analysis efficiency.

4. The large-view-field high-throughput high-resolution pathological section analyzer of the present disclosure adopts the convolution neural network to analyze pathological conditions, and the existing instrument structure does not need to be changed, so that the high-resolution reconstructed image of the pathological section sample can be intelligently analyzed, and errors caused by repeated operations of doctors and inconsistent judgment of pathological conditions caused by subjective factors of different doctors can be avoided.

5. The large-field, high-throughput and high-resolution pathological section analyzer of the present disclosure can analyze and judge the benign and malignant tumor and tissue microenvironment in the pathological section sample without staining the high-resolution reconstructed image, thus simplifying the analysis process of pathological section.

The above description is only an overview of the technical solutions of the present disclosure. In order to better understand the technical means of the present disclosure, it can be implemented according to the content of the description, and in order to make the above and other purposes, features and advantages of the present disclosure more obvious and understandable, the following are preferred embodiments, which is described in detail below with the accompanying drawings.

BRIEF DESCRIPTION OF THE DRAWINGS

FIG. 3B-1 illustrates a schematic diagram of a WSI of mouse lung tissue after registration by a registration algorithm.

FIG. 3B-2 illustrates a schematic diagram of a low-resolution reconstructed image of WSI illustrated in FIG. 3B-1

FIG. 3C-1 illustrates a schematic diagram of WSI of mouse atrial tissue after registration by a registration algorithm.

FIG. 3C-2 illustrates a schematic diagram of a low-resolution reconstructed image of WSI illustrated in FIG. 3C-1.

FIGS. 4A-1 to 4A-6 illustrate schematic diagrams of registered low-resolution reconstructed images.

FIGS. 4B-1 to 4B-6 illustrate schematic diagrams of high-resolution reconstructed image patches obtained after super-resolution reconstruction of the registered low-resolution reconstructed images illustrated in FIGS. 4A-1 to 4A-6 by a convolution neural network model.

FIGS. 4C-1 to 4C-6 illustrate schematic diagrams of WSI of the high-resolution reconstructed image patches illustrated in FIGS. 4B-1 to 4B-6.

FIG. 5A-1 illustrates a schematic diagram of a high-resolution reconstructed image after the super-resolution reconstruction.

FIG. 5A-2 illustrates a schematic diagram of a cancer area (dark gray area) marked by experts.

FIG. 5B-1 illustrates a schematic diagram of another high-resolution reconstructed image after the super-resolution reconstruction.

FIG. 5B-2 illustrates a schematic diagram of a cancer area (dark gray area) marked by experts.

DETAILED DESCRIPTION OF EMBODIMENTS

In order to further explain technical means and effects adopted by the present disclosure to achieve the intended purpose of the present disclosure, a large field-of-view high-throughput high-resolution pathological section analyzer and analysis method proposed according to the present disclosure will be described in detail with reference to the attached drawings and specific embodiments.

The foregoing and other technical contents, features and effects of the present disclosure can be clearly presented in the following detailed description of the specific embodiments taken in conjunction with the accompanying drawings. Through the description of the specific embodiments, we can have a deeper and more specific understanding of the technical means and effects of the present disclosure to achieve the intended purpose. However, the attached drawings are only for reference and explanation, and are not intended to limit the technical schemes of the present disclosure.

Figure 1:
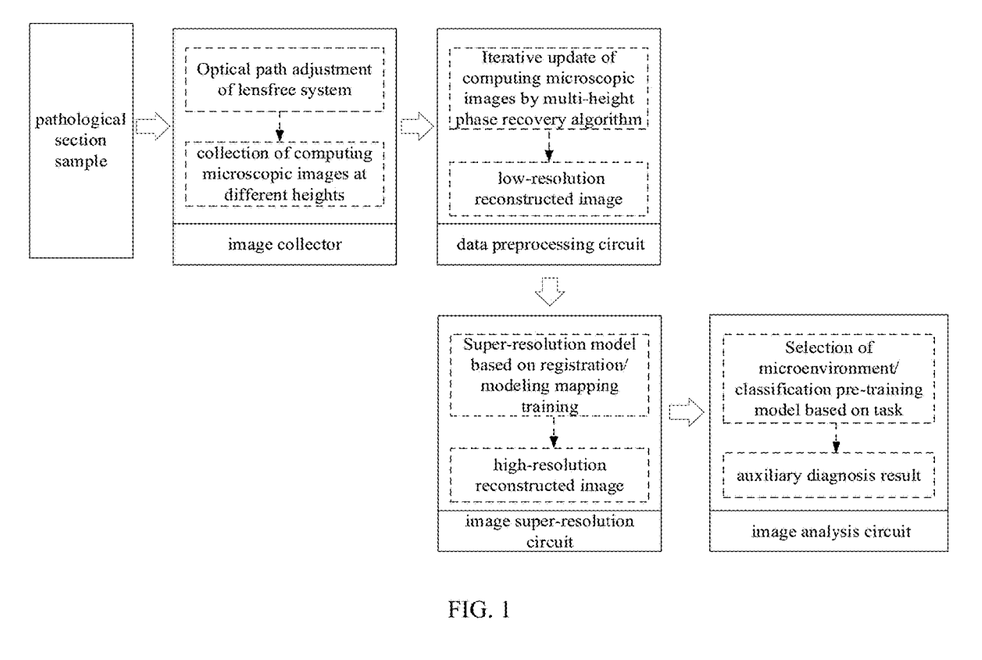
FIG. 1 illustrates an implementation flowchart of a pathological section analyzer with large field of view, high throughput and high resolution according to an embodiment of the present disclosure.

Please refer to FIG. 1, which illustrates a structural flowchart of a pathological section analyzer with large field of view, high throughput and high resolution according to an embodiment of the present disclosure. As shown in FIG. 1, the pathological section analyzer of the embodiment of the present disclosure includes an image collector, a data preprocessing circuit, an image super-resolution circuit and an image analysis circuit.

The image collector is configured to obtain a set of computing microscopic images corresponding to an input pathological section sample. In an alternative embodiment, the image collector includes a lensfree coaxial computing microscopic multi-height image collection system, a one-dimensional translation stage and a two-dimensional (2D) electric translation stage. The lensfree coaxial computing microscopic multi-height image collection system includes a monochromatic laser light source, a pinhole, a section sample objective table, a CMOS image sensor and an optical connection component. In the image collector, first of all, it is necessary to adjust an optical path of the lensfree coaxial computing microscopic multi-height image collection system with the aid of the one-dimensional translation stage and the two-dimensional electric translation stage, so that the laser light source, a target area of the sample and the photosensitive plane of the CMOS image sensor are all in the same spatial position. Secondly, it is necessary to adjust the clamping mode and angle of the sample, so as to keep the plane of the pathological section sample perpendicular to the light path direction as much as possible. Finally, the CMOS image sensor is moved at equal intervals, so that the set of computing microscopic images at different heights of the input pathological section sample is collected.

Figure 2A:
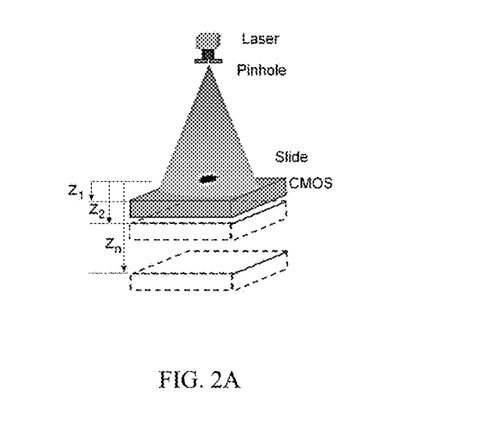
FIG. 2A illustrates a schematic diagram of a lensfree coaxial computing microscopic multi-height image collection system according to an embodiment of the present disclosure.
Figure 2B:
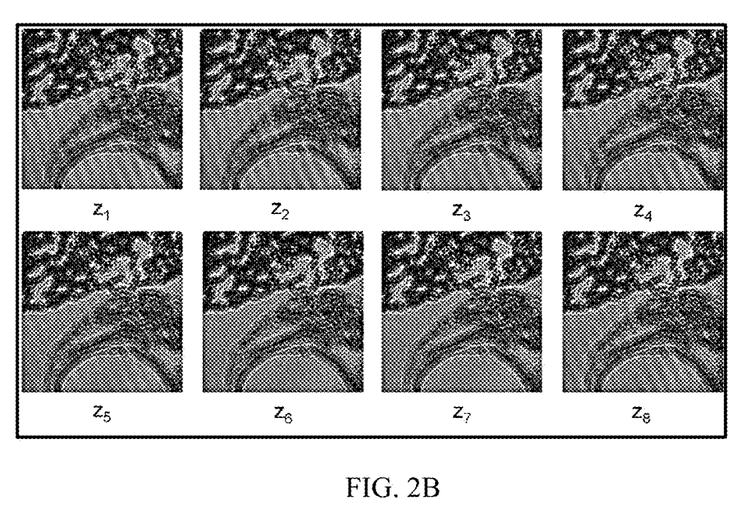
FIG. 2B illustrates schematic diagrams of computing microscopic images at eight different heights collected by the lensfree coaxial computing microscopic multi-height image collection system illustrated in FIG. 2A.

In order to further explain the image collector mentioned in the present disclosure, the embodiment of the present disclosure gives a schematic structural diagram of the lensfree coaxial computing microscopic multi-height image collection system in FIG. 2A. By moving the CMOS image sensor along the optical path propagation direction, the computing microscopic images of the pathological section sample at n different heights can be collected, FIG. 2B illustrates a set of local holograms of the lung tissue at eight different heights, that is, $z_1, z_2, \ldots, z_8$.

The data preprocessing circuit is configured to perform data preprocessing on the set of computing microscopic images. In the data preprocessing circuit, first of all, with the help of a registration algorithm, the first height of the computing microscopic image is taken as a reference, and the remaining heights of the computing microscopic images are slightly moved in a horizontal direction, so that the computing microscopic image area at each height can be completely overlapped. Therefore, the influence of the lateral drift caused by the longitudinal movement of the CMOS image sensor on the multi-height phase recovery result is reduced. Secondly, a multi-height phase recovery algorithm is used for iterative updating to suppress twin images around true images, and increase contrast between the real image texture and the background.

In the embodiment, the multi-height phase recovery algorithm first needs to calculate true defocus distances corresponding to the computing microscopic images at the different heights. The prior information of the true defocus distance is an estimated distance between the pathological section sample and the CMOS image sensor when the pathological section analyzer with large field of view, high throughput and high resolution is built. An image structure tensor of each search step is calculated according to formula (1):

$$S(x, y) = G(x, y) * \left[ \nabla U(x, y) \cdot \nabla U(x, y)^T \right] \quad (1)$$

$$= \begin{bmatrix} G(x, y) * U_x^2(x, y) & G(x, y) * U_x(x, y)U_y(x, y) \\ G(x, y) * U_x(x, y)U_y(x, y) & G(x, y) * U_y^2(x, y) \end{bmatrix}$$

Where $U(x, y)$ represents interference image information collected by the image collector; $\nabla U(x, y) = [U_x(x, y), U_y(x, y)]^T$ represents the 2D spatial gradient in x and y directions; $G(x, y)$ represents the non-negative convolution kernel, which is usually chosen as the two-dimensional Gaussian function; $\nabla$ represents the gradient operator, T represents the transpose. According to the calculated image structure tensors, a structure tensor curve is drawn to find the maximum point, which is the true distance z between the pathological section sample and the CMOS image sensor. The above steps are repeated to obtain the true defocus distances $[z_1, z_2, \ldots, z_n]$ corresponding to the computing microscopic images at the different heights.

In the embodiment, the multi-height phase recovery algorithm calculates the true defocus distances $[z_1, z_2, \ldots, z_n]$ according to the above steps, then inversely propagates the computing microscopic image collected at the first height to the object plane by the angular spectrum propagation theory of formula (2), and then performs forward propagation based on the true defocus distance of the second computing microscopic image (i.e., the computing microscopic image at the second height) to obtain an simulated computing microscopic image corresponding to the true defocus distance $z_2$, and replaces a real part of the simulated computing microscopic image with the computing microscopic image collected at the second height, and inversely propagates the combined computing microscopic image again to the object plane; the above process is repeated for many times, so that a low-resolution reconstructed image after the twin images are suppressed can be obtained.

$$I(x, y) = \xi^{-1}\left\{\xi[U(x, y)]\exp\left[ikz\sqrt{1 - \lambda^2 f_x^2 - \lambda^2 f_y^2}\right]\right\} \quad (2)$$

Where represents the Fourier transform, $\xi^{-1}$ represents the Fourier inversion, i represents the complex symbol, $k=2\pi/\lambda$, $\lambda$ represents the monochromatic light wavelength, $f_x$, $f_y$ represent spatial frequencies, z represents the true distance between the pathological section sample and the CMOS image sensor.

Figure 3A:
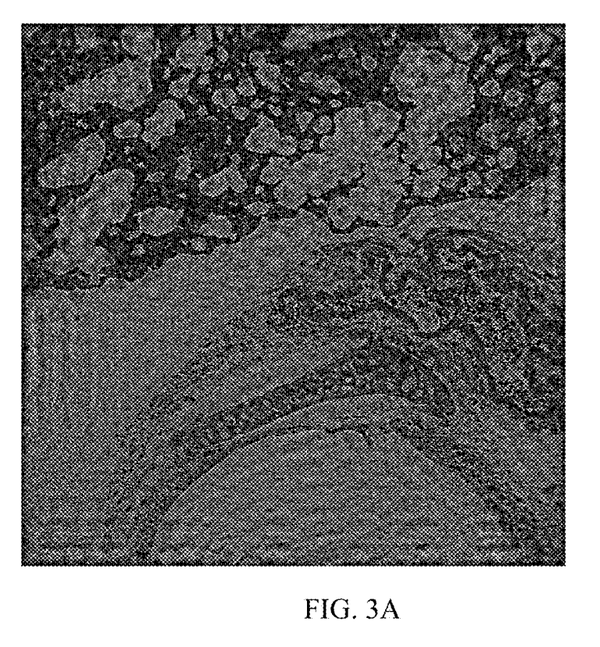
FIG. 3A illustrates a schematic diagram of a low-resolution reconstructed image obtained by reconstructing the computing microscopic images at the eight different heights in FIG. 2B by a multi-height phase recovery algorithm.
Figure 3B:
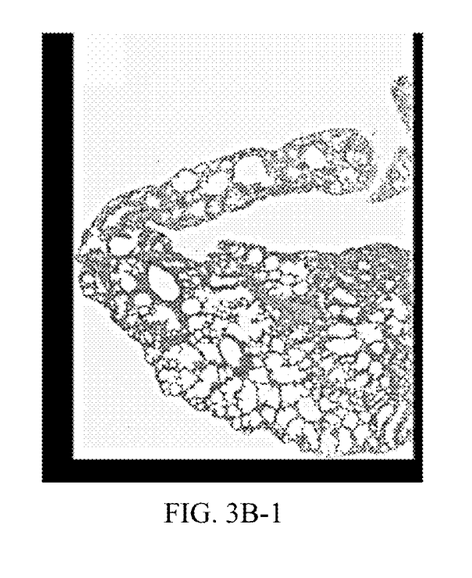
Figure 3B:
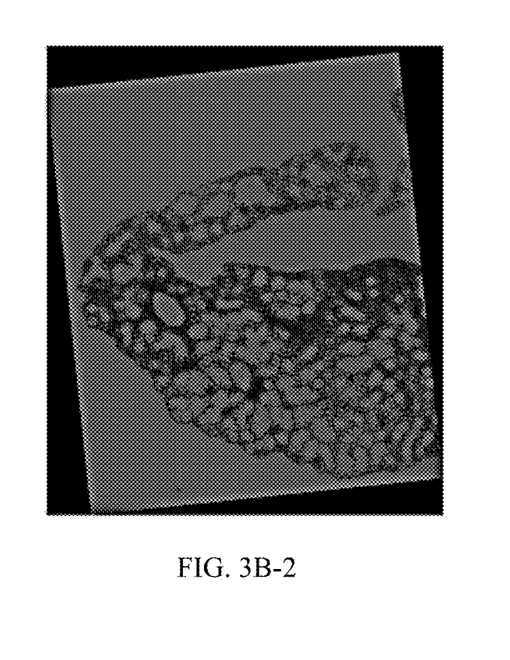
Figure 3C:
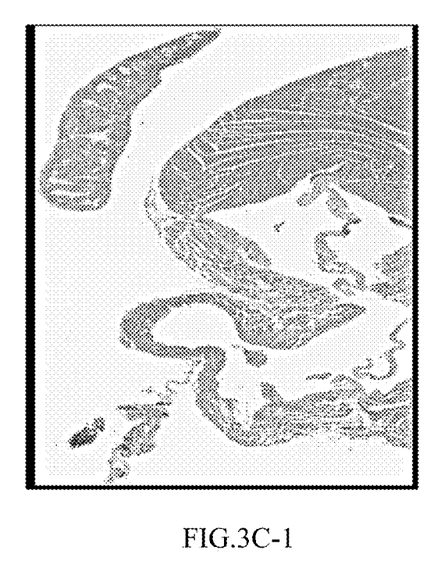
Figure 3C:
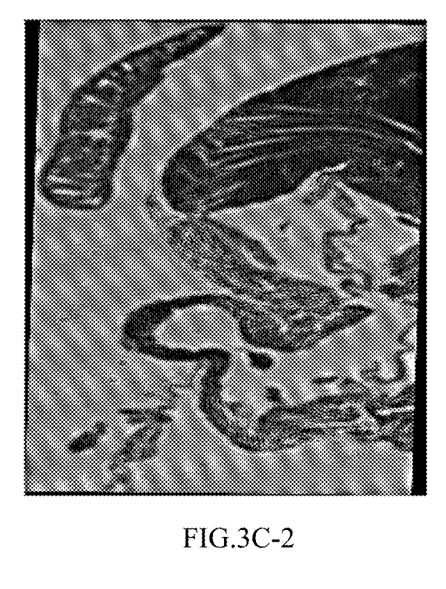
Figure 4A:
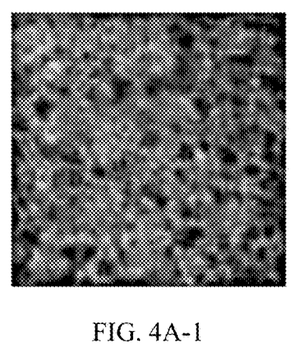
Figure 4A:
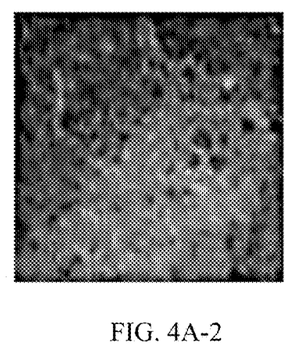
Figure 4A:
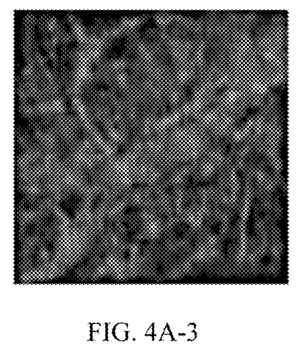
Figure 4A:
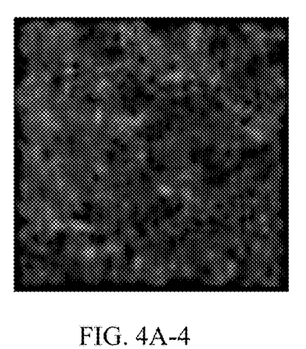
Figure 4A:
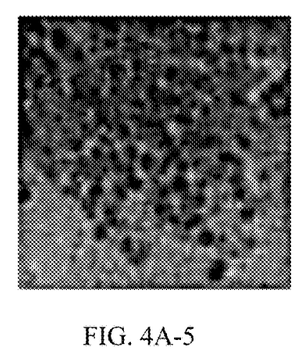
Figure 4A:
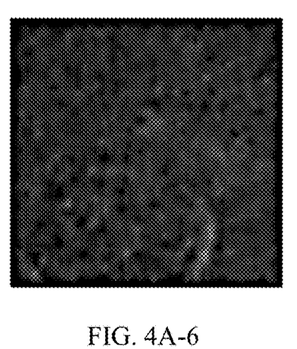
Figure 4B:
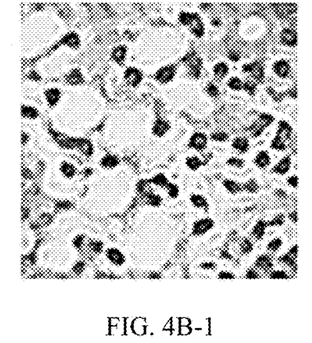
Figure 4B:
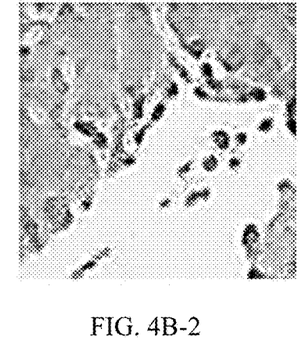
Figure 4B:
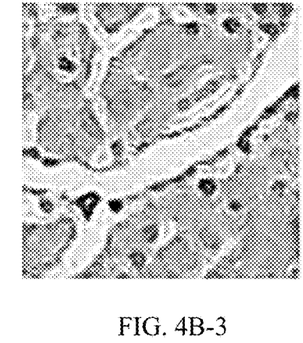
Figure 4B:
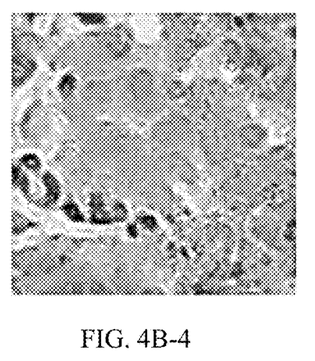
Figure 4B:
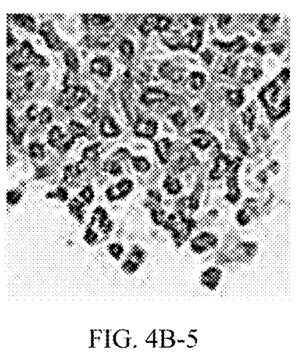
Figure 4B:
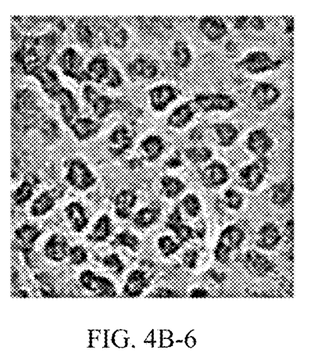
Figure 4C:
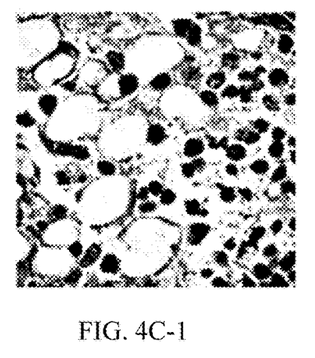
Figure 4C:
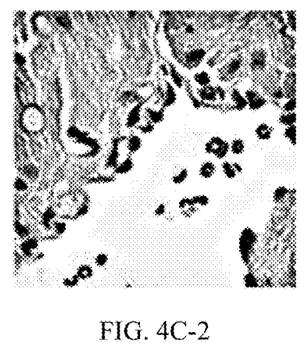
Figure 4C:
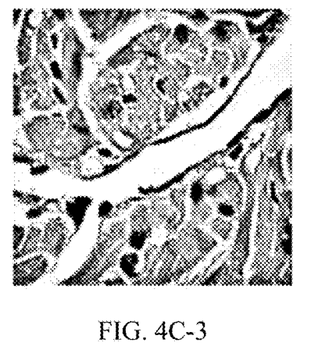
Figure 4C:
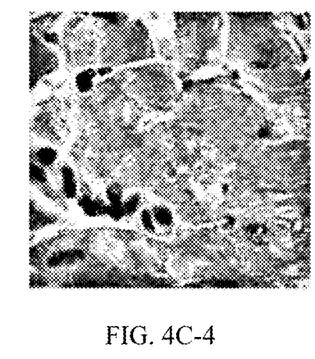
Figure 4C:
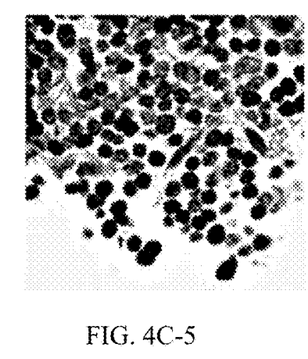
Figure 4C:
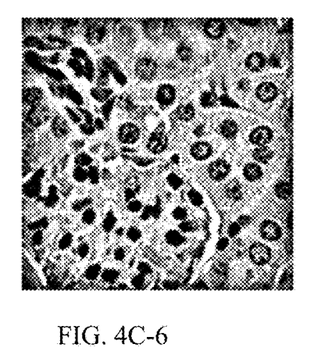

After the multi-height phase recovery, the data preprocessing circuit of the embodiment will suppress some of twin images and increase the contrast between the texture of true tissue section and the background. As shown in FIG. 3A, FIG. 3A shows a low-resolution reconstructed image corresponding to a lung tissue sample, but its resolution is still not enough to meet the needs of pathologists for marking sections.

The image super-resolution circuit is configured to improve the resolution of the low-resolution reconstructed image. The strategy of registration mapping is adopted in the embodiment to train a convolutional neural network, which is used to learn a mapping relationship between the low-resolution reconstructed image and a hematoxylin-eosin (HE) staining WSI. Before formally training the convolutional neural network to learn the mapping relationship between the low-resolution reconstructed image and the HE staining WSI, it is necessary to correct the displacement and rotation errors between the low-resolution reconstructed image and the corresponding HE staining WSI, that is, first their sizes are aligned by bilinear interpolation, and then registering them in the spatial dimension. The registered WSI and its reconstructed image are shown in FIG. 3B-1, FIG. 3B-2, FIG. 3C-1, and FIG. 3C-2. FIG. 3B-1 and FIG. 3B-2 show the WSI of mouse lung tissue and its multi-height holographic reconstruction image in turn, FIG. 3C-1 and FIG. 3C-2 show the WSI of mouse atrial tissue and its multi-height holographic reconstruction image in turn. Then, the registered HE staining WSI and the low-resolution reconstructed image are cropped with the size of 255*255 pixels, and then the data set is amplified by using data augmentation technology. Finally, the convolution neural network is trained by using the amplified data set, so as to obtain the mapping relationship between the low-resolution reconstructed image and the HE staining WSI.

In order to further illustrate the feasibility of each step in the image super-resolution circuit mentioned in the present disclosure, as shown in FIG. 3A, FIG. 3A shows the low-resolution reconstructed image of the eight computing microscopic images with different defocus heights shown in FIG. 2B after multi-height phase recovery, and FIG. 3B-1 and FIG. 3B-2 show the WSI of the mouse lung tissue after registration and the low-resolution reconstructed image of the mouse lung tissue, FIG. 3C-1 and FIG. 3C-2 show the WSI of the mouse atrial tissue after registration and the low-resolution reconstructed image of the mouse atrial tissue. FIG. 4A-1 to FIG. 4A-6 show six low-resolution reconstructed image patches with the size of 256*256, FIG. 4B-1 to FIG. 4B-6 show the high-resolution reconstructed image patches after the resolutions of the six low-resolution reconstructed image patches in FIG. 4A-1 to FIG. 4A-6 are improved by the convolution neural network, and FIG. 4C-1 to FIG. 4C-6 show the WSI patches corresponding to the six low-resolution reconstructed image patches in FIG. 4A-1 to FIG. 4A-6.

The image analysis circuit is configured to perform automatic pathological analysis on the high-resolution reconstructed image after the reconstruction. The embodiment illustrates the feasibility of the image analysis circuit by performing the simplest microenvironment analysis task, that is, analyzing the tumor and normal area in the high-resolution reconstructed image. The microenvironment analysis task includes making of labels and training of the test data set, network training and result analysis. When making labels, the pathologists mark the high-resolution reconstructed image according to the existing experience whether it is the tumor or not, that is, if a part of the high-resolution reconstructed image is tumor tissue, it is marked as 1; If some areas are normal tissues, they are marked as 0. During the network training, firstly, all high-resolution images are cropped into image patches with the size of 256*256 pixel, and the image patches and their binary labels are divided into the training data set and the verification data set by 7:3. Then, the convolution neural network is trained by using the data and labels of the training data set and the verification data set to establish the mapping relationship between the high-resolution image patches and their corresponding labels. Finally, the above steps are performed on a number of randomly selected pathological section samples to obtain the high-resolution reconstructed images, and the classification model trained in the above steps is used for prediction and analysis. In the analysis of results, the labels marked by the pathology experts on the test set are mainly used to calculate the number of corresponding false positive, false negative, true positive and true negative image patches, and calculate the accuracy, sensitivity and specificity of the predicted image patch level.

Figure 5A:
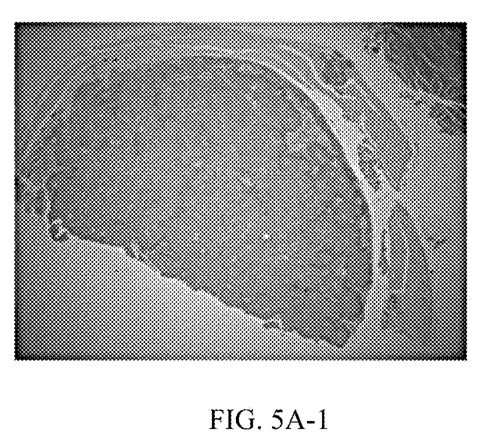
Figure 5A:
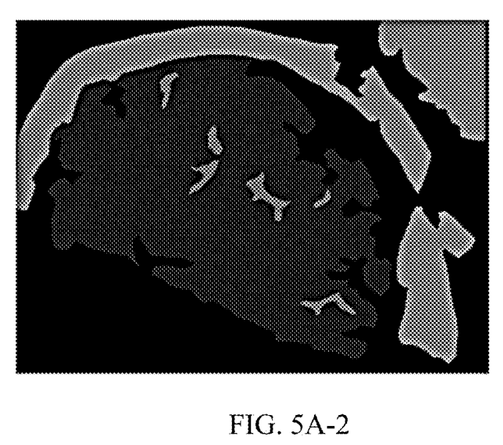
Figure 5B:
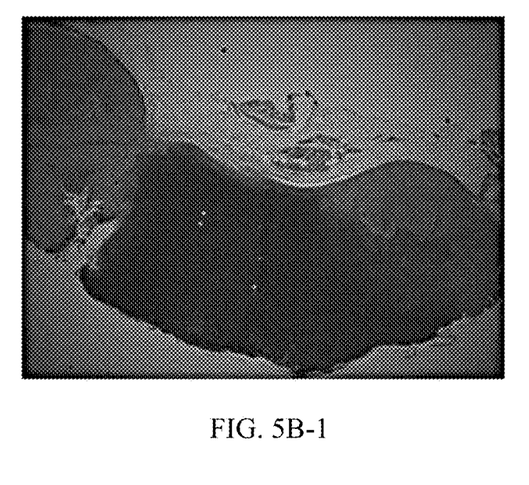
Figure 5B:
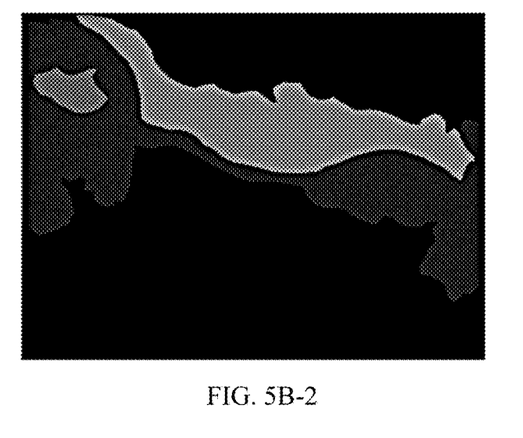
Figure 5C:
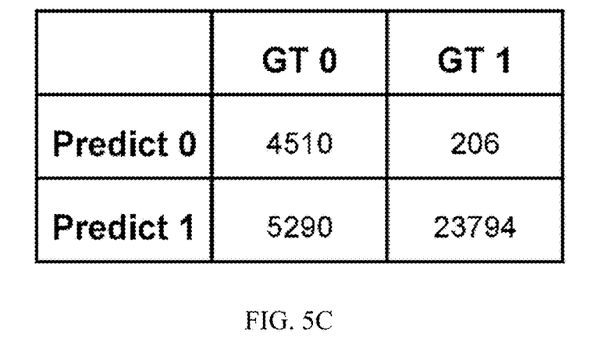
FIG. 5C illustrates a schematic diagram of a confusion matrix of a prediction output of several pathological section samples in a test set by the network.
Figure 5D:
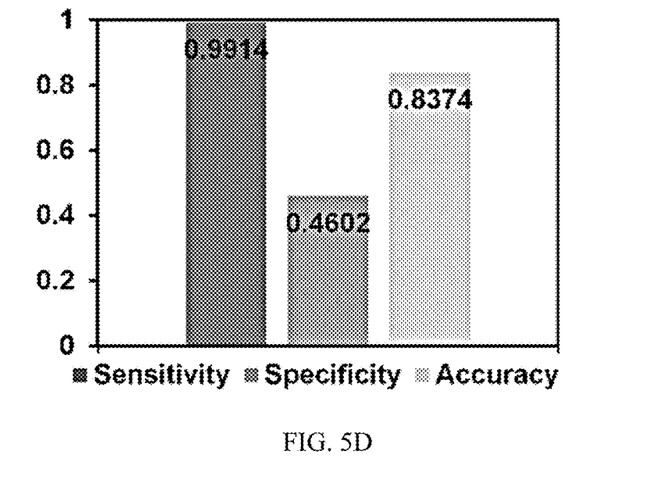
FIG. 5D illustrates a schematic diagram of a binary classification accuracy of the confusion matrix illustrated in FIG. 5C.

In order to further illustrate the feasibility of each step in the image analysis circuit mentioned in the present disclosure, FIG. 5A-1 and FIG. 5B-1 show the high-resolution reconstructed images, dark gray areas in FIG. 5A-2 and FIG. 5B-2 are tumor focus areas drawn by pathologists according to FIG. 5A-1 and FIG. 5B-1, and light gray areas are normal tissue areas drawn by pathologists. FIG. 5C shows a test set prediction confusion matrix containing the number of false positive, false negative, true positive and true negative image patches recorded according to the test set prediction results, and FIG. 5D shows the test set prediction accuracy, sensitivity and specificity calculated according to the test set prediction results.

The large-field-of-view high-throughput high-resolution pathological section analyzer of the embodiment can analyze and judge the microenvironment of the pathological section sample and the benign and malignant degree of the tumor without staining the pathological sections, thus simplifying the analysis process of the pathological sections. In addition, the deep learning network is adopted to analyze pathological conditions, and the existing instrument structure is not changed, so that pathological images can be intelligently analyzed, thus avoiding errors caused by repeated operations by doctors and inconsistent judgment of pathological conditions caused by subjective factors of different doctors.

It should be noted that in this statement, such as multi-height phase recovery, registration, convolutional neural network, mapping relation, the plurality of multi-head self-attention layers, etc. do not refer to the only algorithm technology, but only represent a class of operations that can realize this function. The results shown in FIG. 2A to FIG. 5D are only possible results of the technical scheme of the present disclosure, which only serves as a reference and is used to illustrate the feasibility of the implementation of the technical scheme of the present disclosure, but does not represent the final result of the technical scheme of the present disclosure. The directions or positional relationships indicated by "horizontal" and "longitudinal" are based on the directions or positional relationships shown in the drawings, only for convenience and simplification of the description of the present disclosure, and do not indicate or imply that the referred devices or elements must have a specific orientation, be constructed and operated in a specific orientation, and therefore cannot be understood as limiting the present disclosure.

The above is a further detailed description of the present disclosure combined with specific preferred embodiments, and it cannot be considered that the specific embodiments of the present disclosure are only limited to these descriptions. For ordinary technicians in the technical field to which the present disclosure belongs, without departing from the concept of the present disclosure, some simple deduction or replacement can be made, which should be considered as belonging to the protection scope of the present disclosure.

What is claimed is:

1. A pathological section analyzer, comprising: an image collector, a data preprocessing circuit, an image super-resolution circuit and an image analysis circuit;
    wherein a use process of the pathological section analyzer comprises:
    step 1, obtaining an unstained pathological section sample from clinic;
    step 2, collecting computing microscopic images of the pathological section sample in step 1 at different heights by using the image collector;
    step 3, inputting the computing microscopic images at the different heights in step 2 into the data preprocessing circuit to obtain a low-resolution reconstructed image after twin images are removed;
    step 4, inputting the low-resolution reconstructed image in step 3 into the image super-resolution circuit to obtain a high-resolution reconstructed image; and
    step 5, inputting the high-resolution reconstructed image in step 4 into the image analysis circuit to obtain an auxiliary diagnosis result of the pathological section sample in step 1;
    wherein the image super-resolution circuit is configured to perform the following steps:
    step 41, cropping the low-resolution reconstructed image into image patches with a size of 512*512 pixels in a fixed order, with lengths and widths overlapping by ⅔ pixels;
    step 42, inputting the image patches in step 41 into a pre-trained super-resolution model to obtain high-resolution image patches;
    step 43, replacing pixel values of ⅓ areas at boundaries of the left and right adjacent high-resolution image patches with pixel values of a ⅓ length or width area at a middle of the high-resolution image patch to eliminate boundary blur caused by truncation effect;
    step 44, recovering the high-resolution image patches without the boundary blur obtained in step 43 into the high-resolution reconstructed image according to the fixed order in step 41, and thereby realizing super-resolution of the low-resolution reconstructed image; wherein the high-resolution reconstruction image is also referred to as a whole slide image (WSI) in clinical electronic scanning.

2. The pathological section analyzer according to claim 1, wherein the image collector comprises: a lensfree coaxial computing microscopic multi-height image collection system, a one-dimensional translation stage and a two-dimensional electric translation stage;
    wherein the lensfree coaxial computing microscopic multi-height image collection system comprises a monochromatic laser light source, a pinhole, the pathological section sample, an objective table, a complementary metal oxide semiconductor (CMOS) image sensor and an optical connection component; wherein a spherical wave emitted by the monochromatic laser light source is filtered by the pinhole and then transmitted to a plane of the pathological section sample placed on the objective table to generate a surface wave and a reference wave, and the surface wave and the reference wave interfere to form a hologram, which is recorded by the CMOS image sensor to obtain a computing microscopic image;
    wherein the one-dimensional translation stage and the two-dimensional electric translation stage are an integrated optical component, which are respectively configured to adjust the CMOS image sensor in the lensfree coaxial computing microscopic multi-height image collection system back and forth along an optical path direction, and adjust a position of the monochromatic laser light source, thereby to make a light wave emitted by the monochromatic laser light source illuminate the pathological section sample;
    wherein the lensfree coaxial computational microscope multi-height image collection system is configured to collect the computing microscopic images at the different heights, and specifically configured to perform the following steps:
    step 21, adjusting the two-dimensional electric translation stage controlling the monochromatic laser light source and the one-dimensional translation stage controlling the CMOS image sensor to make the light wave emitted by the monochromatic laser light source completely cover a photosensitive plane of the CMOS image sensor;
    step 22, recording a computing microscopic image captured by the CMOS image sensor when the pathological section sample is not placed on the objective table;
    step 23, placing the pathological section sample on the objective table, rotating a knob of the one-dimensional translation stage forward at a fixed interval along a light wave transmission direction, and capturing the computing microscopic images at the different heights by the CMOS image sensor; and
    step 24, taking the computing microscopic images collected in steps 22 and 23 as a set of computing microscopic images corresponding to the pathological section sample.

3. The pathological section analyzer according to claim 2, wherein the data preprocessing circuit is configured to use a multi-height phase recovery algorithm to iteratively update the set of computing microscopic images of the pathological section sample to eliminate interference of the twin images, and specifically configured to perform the following steps:

step 31, registering the computing microscopic images at the different heights to eliminate lateral drift among the computing microscopic images at the different heights when rotating the knob of the one-dimensional translation stage;

step 32, iteratively updating the registered computing microscopic images at the different heights according to the multi-height phase recovery algorithm to obtain the low-resolution reconstructed image after the twin images are removed.

4. The pathological section analyzer according to claim 3, wherein the pre-trained super-resolution model is obtained by using different training methods according to different sources of actually available hematoxylin-eosin (HE) staining WSIs; when HE-staining WSIs corresponding to tissue areas adjacent to the pathological section sample are obtained, the pre-trained super-resolution model is obtained by training with a training strategy based on registration mapping, or when any HE staining WSI irrelevant to the pathological section sample is obtained, the pre-trained super-resolution model is obtained by training with a training strategy based on modeling mapping;

wherein the training strategy based on registration mapping is obtained by the following steps:

step 61, obtaining low-resolution reconstructed images of pathological section samples;

step 62, searching and intercepting a HE staining WSI which is consistent with an area of a corresponding one of the low-resolution reconstructed images in step 61 from the adjacent HE staining WSIs of each of the pathological section samples;

step 63, interpolating and scaling each the low-resolution reconstructed image in step 61 with a size of the corresponding HE staining WSI in step 62 as a reference to make their widths and heights are equal;

step 64, registering the low-resolution reconstructed images with same image sizes with HE staining WSIs corresponding thereto;

step 65, cropping the registered low-resolution reconstructed images and the registered HE-staining WSIs according to a size of 512*512 pixels to obtain low-resolution reconstructed image patches and HE staining WSI patches required for network training;

step 66, training a mapping relationship between the low-resolution reconstructed image patches and the HE staining WSI patches in step 65 by using a convolutional neural network to obtain the pre-trained super-resolution model trained by the training strategy based on registration mapping;

wherein the training strategy of modeling mapping is obtained by the following steps:

step 71, cropping any HE staining WSI into HE staining WSI patches with a same size as a computing microscopic image captured by the CMOS image sensor, and using the HE staining WSI patches as a training data set of a simulation model;

step 72, recording setting of parameters of the lensfree coaxial computing microscopic multi-height image collection system; wherein the parameters comprise a diffraction distance z, a wavelength $\lambda$ of the monochromatic laser light source, a pixel size pix of the CMOS image sensor;

step 73, defining an angular spectrum diffraction physical model corresponding to the parameters in step 72 in an upper branch of the simulation model, wherein an initial input of the angular spectrum diffraction physical model is the HE staining WSI patches in step 71; defining a convolution neural network model in a lower branch of the simulation model to learn a mapping relationship between computing microscopic images output by the upper branch and the HE staining WSI patches in step 71, wherein an output of the lower branch is an input of the upper branch in subsequent iterations; and optimizing the convolution neural network model of the lower branch by quantifying a difference between the output of the lower branch and the HE staining WSI patches in step 71; and step 74, when the difference in step 73 is less than a preset value, obtaining the pre-trained super-resolution model trained by the training strategy based on modeling mapping.

5. The pathological section analyzer according to claim 3, wherein the image analysis circuit is configured to predict microenvironments or section-level classify in the high-resolution reconstructed image according to different auxiliary diagnostic tasks, and specially configured to perform the following steps:

step 51, cropping the high-resolution reconstructed image into high-resolution image patches with a size of 256*256;

step 52, inputting the high-resolution image patches in step 51 into a pre-training network model of microenvironment analysis to obtain a microenvironment composition of each area in the high-resolution reconstructed image; and step 53, inputting the high-resolution image patches in step 51 into a pre-training classification model to obtain a category attribute of the high-resolution reconstructed image;

wherein the pre-training network model of microenvironment analysis is obtained by the following steps:

step 81, obtaining high-resolution reconstructed images of pathological section samples;

step 82, annotating the high-resolution reconstructed images in step 81, wherein fat is annotated as 0, a tissue fragment is annotated as 1, a lymphocyte is annotated as 2, mucus is annotated as 3, a smooth muscle is annotated as 4, a matrix is annotated as 5, a normal tissue is annotated as 6 and a tumor tissue is annotated as 7;

step 83, dividing each of the high-resolution reconstructed images with annotations according to a size of 256*256 pixels to obtain high-resolution image patches and microenvironment labels corresponding thereto, and dividing the high-resolution image patches and the microenvironment labels corresponding thereto into a training data set and a verification data set by 7:3; and step 84, training a convolutional neural network by using the training data set and the verification data set to obtain a mapping relationship between the high-resolution image patches and the microenvironment labels, and obtaining the pre-training network model for microenvironment analysis;

wherein the pretraining classification model is obtained by the following steps:

step 91, obtaining high-resolution reconstructed images of pathological section samples;

step 92, dividing each of the high-resolution reconstructed images with a size of 256*256 pixels to obtain high-resolution image patches, and storing the high-resolution image patches corresponding to the same divided high-resolution reconstructed image in a same bag, wherein a label of the bag is the label of the corresponding pathological section sample;

step 93, using a feature extractor to extract feature representation of the high-resolution image patches in each the bag to obtain a feature representation matrix corresponding to each the bag;

step 94, using k-means clustering to obtain a cluster center matrix corresponding to each the feature representation matrix, and calculating a cosine similarity between each the high-resolution reconstructed image patch in the feature representation matrix and each the cluster center vector in the cluster center matrix to form a similarity matrix;

step 95, inputting each the feature representation matrix and the similarity matrix into a plurality of multi-head self-attention layers in rows and columns to obtain an aggregation matrix;

step 96, applying gated attention to the aggregation matrix to obtain section-level aggregation vectors and predicted outputs; and step 97, establishing constraints between the predicted outputs in step 96 and corresponding section level labels for network training, and repeatedly executing a plurality of training batches to obtain the pre-training classification model.

* * * * *